(12) United States Patent
Planca et al.

(10) Patent No.: US 6,715,706 B1
(45) Date of Patent: Apr. 6, 2004

(54) REMOVABLE FOOD PROCESSING TOOL SUPPORT SYSTEM FOR BLENDERS, FOOD PROCESSORS, GRINDERS AND SIMILAR APPARATUS

(75) Inventors: Rinaldo Planca, Sao Bernardo do Campo (BR); Jose Carlos Veneziano, Sao Paulo (BR)

(73) Assignee: Arno S.A., Sao Paulo (BR)

( * ) Notice: Subject to any disclaimer, the term of this patent is extended or adjusted under 35 U.S.C. 154(b) by 0 days.

(21) Appl. No.: 09/786,767
(22) PCT Filed: Sep. 7, 1999
(86) PCT No.: PCT/IB99/01519
§ 371 (c)(1), (2), (4) Date: Mar. 9, 2001
(87) PCT Pub. No.: WO00/13563
PCT Pub. Date: Mar. 16, 2000

(30) Foreign Application Priority Data

| Sep. 9, 1998 | (BR) | ................................................ | 9803559 |
| Oct. 6, 1998 | (BR) | ................................................ | 9804164 |
| Apr. 13, 1999 | (BR) | ................................................ | 9901626 |

(51) Int. Cl.$^7$ ............................................. B02C 25/00
(52) U.S. Cl. ..................... 241/36; 241/37.5; 241/281.2; 366/206; 366/314
(58) Field of Search ................................ 366/205, 314, 366/206, 347; 241/36, 37.5, 281.2, 281.3

(56) References Cited

U.S. PATENT DOCUMENTS 3,786,999 A    1/1974   Cabell 5,360,176 A    11/1994  Mugge et al.
5,584,577 A    12/1996  Thies

FOREIGN PATENT DOCUMENTS

| EP | 0 567 853 A1 | 4/1993 |
| FR | 1329312 | 4/1963 |

OTHER PUBLICATIONS

Patent Abstracts of Japan vol. 014, No. 310 (C–0736), Jul. 4, 1990 & JP 02 107214 A (Sanyo Electric Co Ltd; Others: 01) Apr. 19, 1990.

*Primary Examiner*—Mark Rosenbaum
(74) *Attorney, Agent, or Firm*—Browdy and Neimark, P.L.L.C.

(57) ABSTRACT

The invention is related to a food processing appliance able to be mounted on a base including an electric motor to form an electrical appliance, comprising a container able to be mounted on said base, said container being associated with a food processing tool support assembly having a support removably secured in an opening provided in the bottom of said container, a rotary axle bearing a food processing tool being mounted through said support, wherein the container comprises locking means moving in a plane transverse to the axis of the food processing tool to engage a conformation of the support in correspondence when said support has been engaged axially in the container and brought to bear against a support area provided around the container opening, said locking means being actionable by a control button mounted on the container.

17 Claims, 13 Drawing Sheets

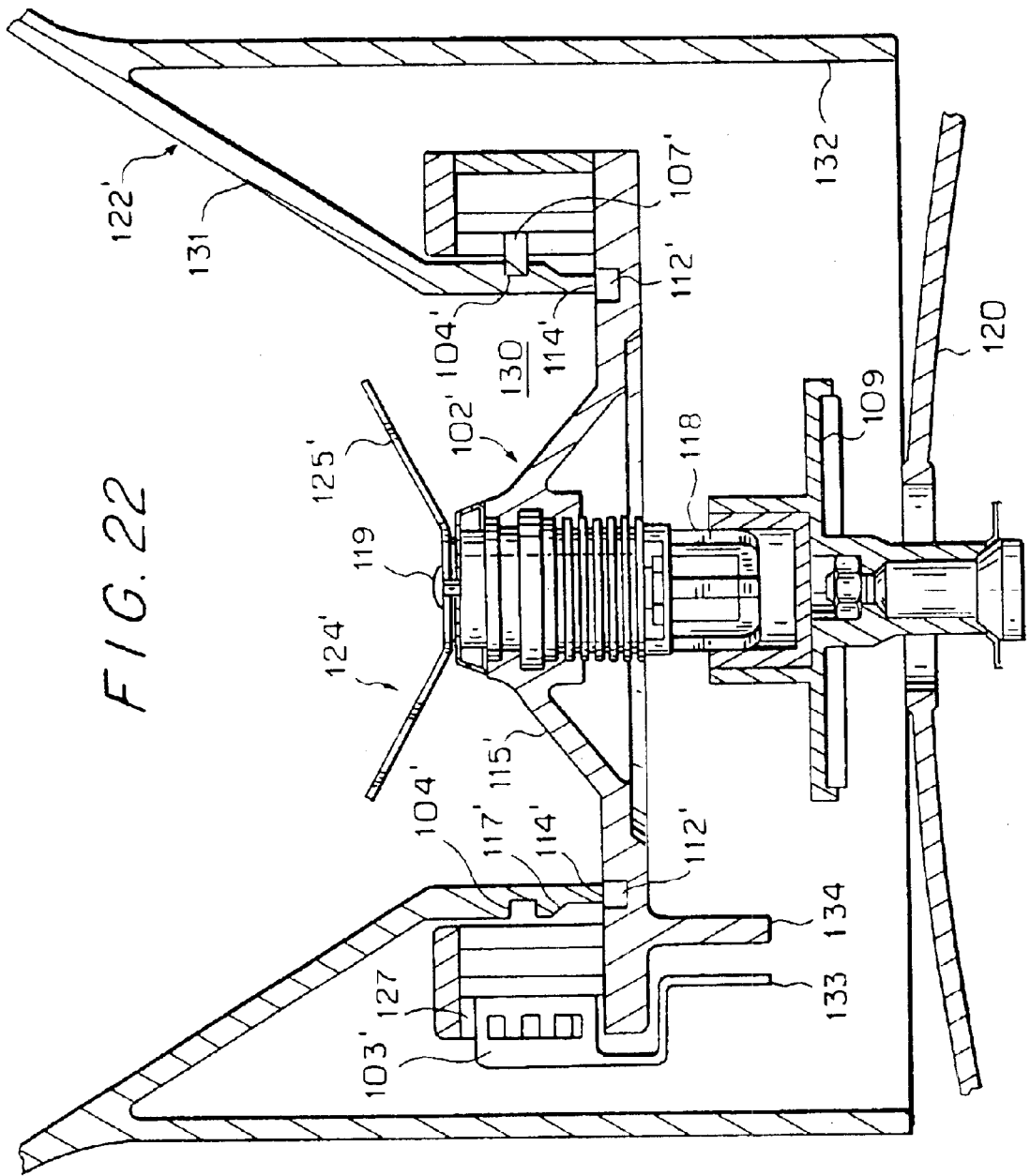

REMOVABLE FOOD PROCESSING TOOL SUPPORT SYSTEM FOR BLENDERS, FOOD PROCESSORS, GRINDERS AND SIMILAR APPARATUS

The present application is the national stage under 35 U.S.C. 371 of international application PCT/IB99/01519, filed Sep. 7, 1999, which designated the United States, and which international application was published under PCT Article 21 (2) in the English lanuage.

The present invention relates to a removable food processing tool support system for home appliances comprising a motor base and a food preparing container or jug, such as blenders, food processors, grinders and other similar apparatus.

The food processing tool of appliances such as blenders rotates at high speeds, up to 20 000 rpm. In this kind of appliances the food processing tool is secured to a rotary axle mounted on the container's or jug's bottom and the container or jug is secured removable on the motor base.

Appliances comprising a container or jug including a removable food processing tool support are already known. U.S. Pat. No. 5,360,176 or FR 1 329 312 disclose a blender jug adapted to be detachably placed on a motor base. A cutter holder is detachably secured in a bottom portion of the blender container, by screw thread means. The cutter holder supports a bearing holding the middle part of a shaft comprising at its upper extremity a cutter and at its lower extremity a coupling able to be driven by the output motor axle of the motor housing. As blenders often comprise a jug having a narrow bottom, the removal of the food processing tool support from the container makes the cleaning of the jug and of the portion around the blades of the food processing tool easier.

However in this kind of appliances, the removal of the food processing tool support by unscrewing is very often considered as not practical. Considerable physical force can be required or some delicate parts are prone to break. On the other side, the reassembling of the support by screwing on the container cannot be very easy, due to a support comprising several parts and due to the fact that the thread entrance cannot be seen when engaging the support.

Additionally, the sealing used in connection with screwed support proves to be fairly inefficient, either due to the fact that the support was not screwed far enough, or to the fact that the sealing ring is quickly damaged when the support is screwed regularly too tight.

The objective of the present invention is to provide a removable food processing tool support system for home appliances of the blender, food processor or grinder type, comprising a container or jug and a food processing tool support assembly, allowing an easy removal of the support assembly from a static container or an easy removal of the container from a static support assembly.

Another objective of the present invention is to provide a removable food processing tool support system for said home appliances having an efficient sealing to avoid leaks.

Another objective of the present invention is to provide a removable food processing tool support system for said home appliances including safety means.

Another objective of the present invention is to provide a removable food processing tool support system for home appliances allowing a complete cleaning of the interior of the apparatus' container as well as of the food processing tools parts of the support assembly.

Another objective of the present invention is to provide an efficient removable food processing tool support system for home appliances, but yet fairly easy and cheap to manufacture.

These objectives can be achieved with a food processing appliance able to be mounted on a separate base including an electric motor to form an electrical appliance from the type blender or food processor, comprising a container able to be mounted on said base, said container being associated with a food processing tool support assembly having a support removably secured in an opening provided in the bottom of said container, a rotary axle being mounted through said support, said axle bearing at one of its extremities an engaging element able to be driven by the electric motor when said container is mounted on said base and at the other of its extremities a food processing tool, wherein the container comprises locking means moving in a plane transverse to the axis of the food processing tool to engage (a) conformation(s) of the tool support in correspondence when said tool support has been engaged axially in the container and brought to bear against a support area provided around the container opening, said locking means being actionable by a control button mounted on the container, or reverse, the tool support comprising the control button and the locking means engaging a conformation(s) of the container, said container being engaged axially on the tool support.

The moving of the locking means in a plane transverse to the axis of the tool can not only be a radial translation towards and away from said axis, but also a rotating movement of an arm or of a pair of arms forming a tweezers, or any other combination of rotation and translation.

Thus the removal of the food processing tool support assembly from the container as well as the placement of re-installation of said support assembly on said container are very simple, thanks to the fast and safe coupling system, always guaranteeing the correct position of the food processing tool support. For removing the tool support, it suffice to act on the button to disengage it axially; and, to install the tool support cleaned or equipped with an other type of tool, like an ice crusher, it suffice to push it axially so that it bears against the container support and to act on the control button.

Incidentally, and in co-operation, the locks conformation(s) is/are positioned so that there is an effective right seal between the tool support and the container, an eventual sealing O-ring being always properly squeezed, neither to tight, nor to loose.

According to a first kind of embodiment, the locking means are provided on the container. Alternatively, according to a second kind of embodiment, the locking means are provided on the support assembly.

According to a type of embodiment, the control button is moveable between a locked position in which the locking means are able to hold the tool support against the support area and a released position in which the locking means are able to release the tool support from the support area.

According to a preferred type of embodiment the control button is mounted against elastic return means able to bias the locking means and said control button into the locked position.

Advantageously, the opening is circular, the support area being ring-shaped, the corresponding part of the tool support being also ring-shaped, and the conformation(s) of the tool support, or reverse the conformation(s) of the container, in which engage the locking means, is/are (an) annular groove (s). Thus no specific angular orientation would be required. Such a construction eases the positioning of the support assembly into the container. However, the friction forces at the contact area between the tool support and the container support area prevent the tool support from turning when the motor drives the tool in rotation.

Advantageously a sealing ring is provided between the support area and the tool support. This simple and efficient sealing system avoids furthermore the leakage of water and other liquids contained inside the container. Preferably, this sealing ring is mounted on the food processing tool support assembly or on the support area of the container.

According to a first specific embodiment, the locking means are made by three locks, or tongues, regularly spaced around the periphery of the conformation(s).

An example of embodiment can comprise an annular button mounted on the lower face of the tool support around the bearing, the external periphery of said annular button having three regularly spaced cams provided for pushing respectively in an radial outward direction locks mounted on one extremity of arm of which other extremity is mounted rotary on the tool support against an elastic means. The container presents then an annular groove arranged at the same level that of the locks when the tools support is correctly pushed against the support area of the container.

In a preferred realisation of the first embodiment, locking means comprise a belt surrounding the opening provided in the bottom of the container, said belt having a rectilinear length able to co-operate with the control button, a lock being provided at the opposite of said length, two arms of a pincers projecting from said rectilinear length, a lock being provided at the free end of each arm, said locking means being able to enter in the conformation(s).

According to a second specific embodiment, locking means are provided on the container and comprise a locking plate having an aperture formed by a first hole, whose diameter corresponds to the diameter of a reduced cylindrical body of the tool support, and a second hole, whose diameter is larger than the diameters of said cylindrical body and of an engaging element of the tool support assembly.

Advantageously thus, the reduced cylindrical body is provided between a conic body of the tool support and the engaging element, said conic body being able to fit in a through conical hole provided in the bottom of the container.

According to a third specific embodiment, locking means comprise a tweezers composed of a pair of arms rotating in a plane transverse to the axle, the outer extremity of each arm being attached in a rotary manner to the periphery of an holding ring, the middle part being shaped as curved slanted locks, the inner extremity showing a slanted front forming, with the slanted front of the other arm, a V-shape, and the holding ring comprises a pair of spring knives, each of them pressing inwardly on the inner extremity of an arm.

In a preferred realisation of the third embodiment, a sliding activating rod is arranged in front of the tweezers, said sliding rod being extended outside the base of the container by said control button, said sliding rod presenting a triangular edge bearing on the slanted on the front of each arm of lock.

Advantageously, the electrical appliance also comprises retaining means able to prevent any displacement of the control button from the locked position when the container is mounted on the motor base. Therefore any removal of the support assembly from the container can be prevented as long as the container remains on the motor base. The retaining means can be provided either on the motor base or on the container.

These objectives can also be achieved according to a fourth specific embodiment with a food processing appliance able to be mounted on a separate base including an electric motor to form an electrical appliance from the type blender, food processor or grinder, comprising a food processing tool support assembly mounted on said base, said support assembly having a rotary axle mounted through said support, said axle bearing at one of its extremities an engaging element able to be driven by the electric motor when said support assembly is mounted on said base and at the other of it extremities a food processing tool; and a container having an opening with an edge able to be mounted on said support assembly, wherein the edge of said opening of the container is maintained against a support area provided around the tool support by locking means mounted on the support assembly and engaging in an approximately radial direction (a) conformation(s) of the container, said locking means being actionable by a control button mounted on the support assembly.

According to a type of embodiment, the control button is moveable between a locked position in which the locking means are able to hold the container against the support area and a released position in which the locking means are able to release the container from the support area.

Advantageously, the opening is circular, the support area being ring-shaped, the corresponding part of the container being also ring-shaped, and the conformation(s) of the container, in which engage the locking means, is/are (an) annular groove(s).

Advantageously a sealing ring forming the support area is provided in the food processing tool support assembly.

Advantageously, the electrical appliance also comprises retaining means able to prevent any displacement of the control button from the locked position when the support assembly is mounted on the motor base. Therefore any removal of the container from the support assembly can be prevented as long as the support assembly remains on the motor base. The retaining means can be provided either on the motor base or on the support assembly.

The present invention will be now described with more details by way of examples, with reference to and as shown in the accompanying drawings, in which:

FIG. 22 is a side sectional view of the food processing tool support assembly and of the container mounted on the motor base of an appliance comprising an example of a removable food processing tool support system in accordance with a further variation of the first embodiment of the invention.

A first example of a first embodiment of the invention is shown on FIGS. 1 to 6.

Figure 1:
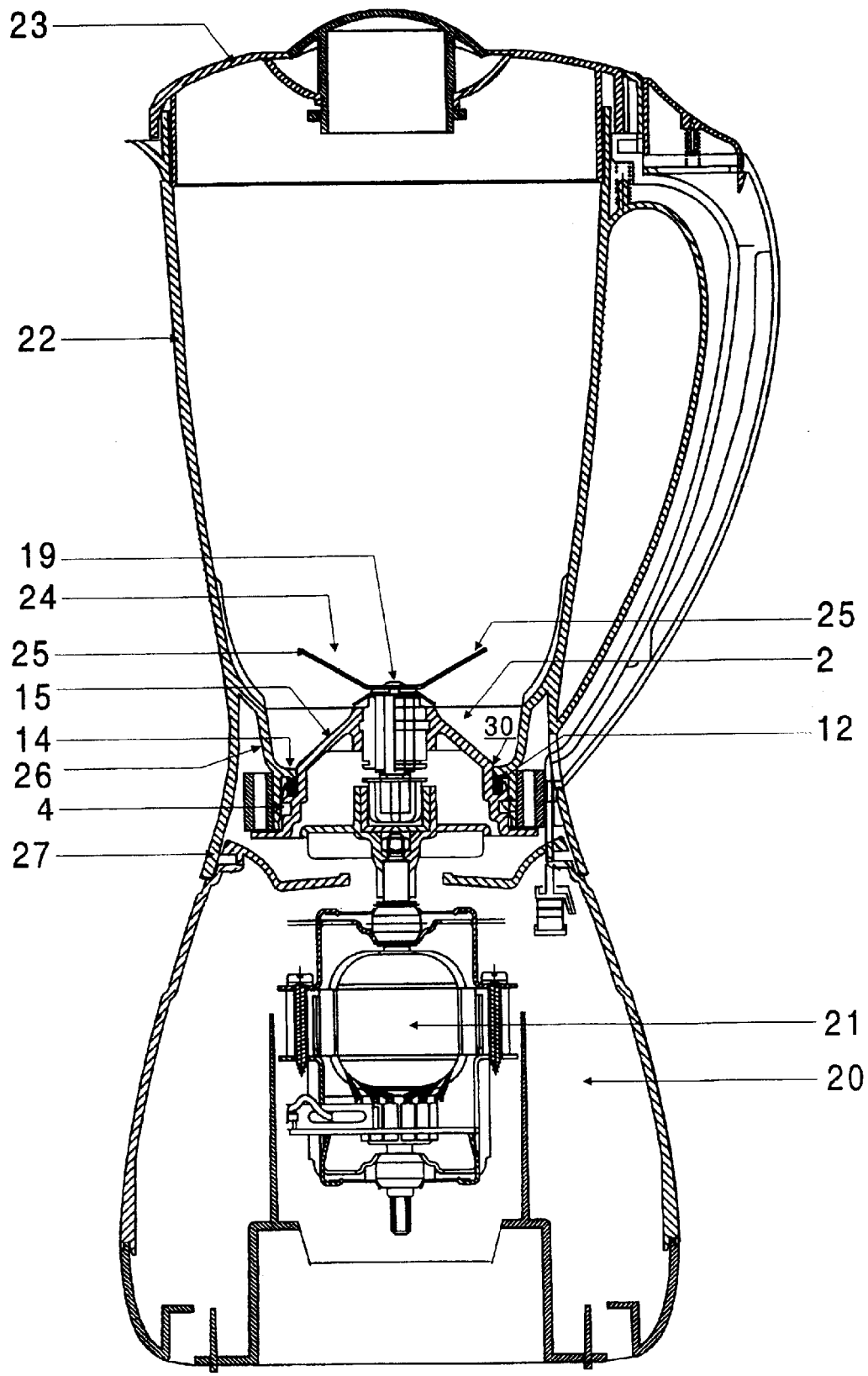
FIG. 1 is a sectional elevation of an appliance comprising a removable food processing tool support system in accordance with a first embodiment of the invention.

The blender according to the invention shown on FIG. 1 comprises a motor base 20 including an electric motor 21, a container or jug 22 with an open top, and also a lid 23 to close the container 22, said container being removably mounted on the motor base. The container 22 comprises a food processing tool support assembly 2 having a support 15 removably secured in an internal opening 30 provided in the bottom of said container, and a rotary axle 19 mounted through said support, bearing at one of its extremities a coupling able to be driven by the electric motor 21 when the container 22 is mounted on the base 20 and at the other of its extremities a food processing tool 24. The food processing tool 24 comprises two upwardly outward inclined blades 25.

The food processing tool support assembly 2 is maintained against a flange 14 belonging to the container 22 and locking means actionable by a control button 3 (FIG. 2) mounted on the container.

Figure 2:
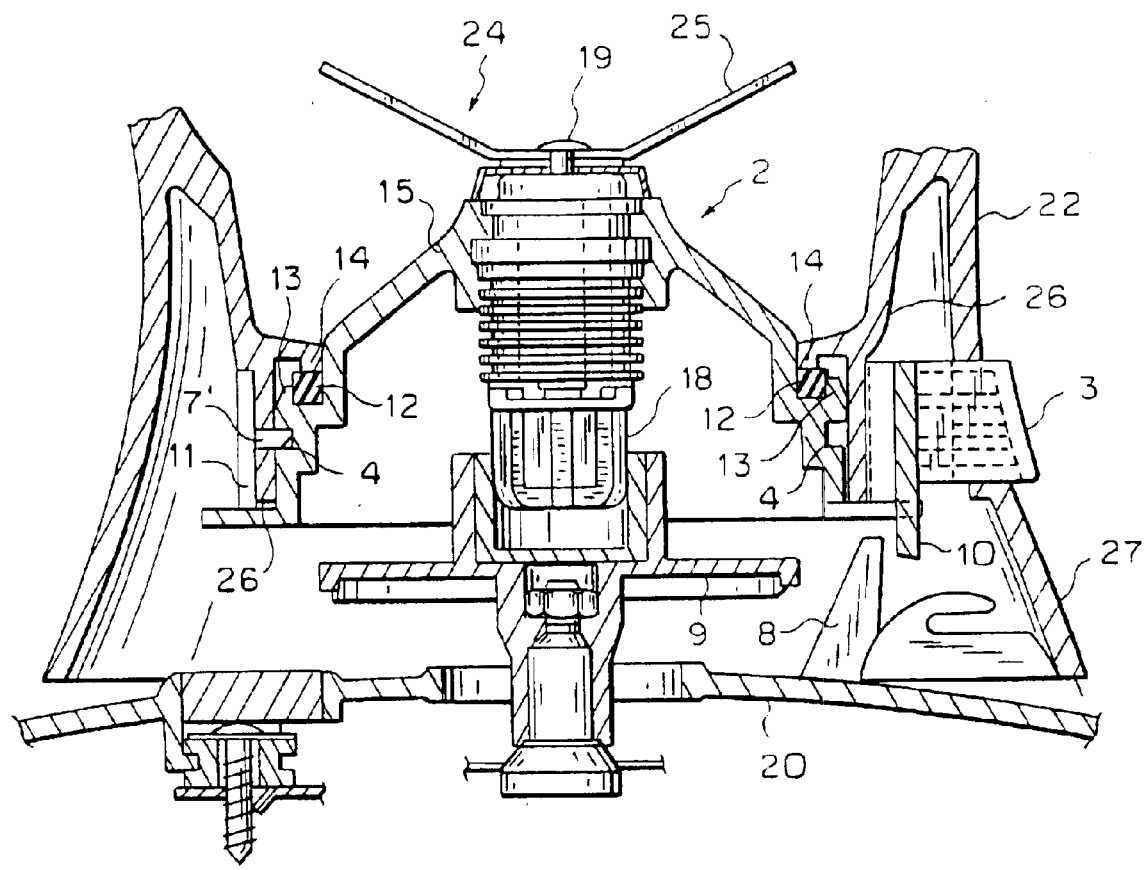
FIG. 2 is a side sectional view of the lower section of the appliance's container shown at FIG. 1, showing with more details the removable food processing tool support system according to first embodiment of the invention.

FIG. 2 shows a side sectional view of the lower part of the container 22 in which the food processing tool support assembly 2 is installed. In this figure, the container 22 is almost engaged on the base 20.

The base 20 comprises a coupling element 9 being attached to the motor axle and being able to couple with an engaging element 18 of the axle 19 which turns within the internal bearing (not shown) of the mentioned assembly 2 and upon which the blades 25 which turn with are attached.

Thus, the coupling element 9 and the engaging element 18 form an elastic coupling sleeve between the motor axle and the support assembly axle 19.

The container 22 comprises an inner skirt 26 surrounded by a flexible material belt 11 and an outer skirt 27 with an through opening receiving the button 3 projecting towards the external side of the container 22, for access of the user. The button 3 is near the base of the container 22. The button 3 is attached to a length of the rectilinear belt 10 of the belt 11 as can be better seen on FIGS. 4 to 6. The button 3 can be pressed by the user, moving through the mentioned opening, however, without unfastening from the container 22. A ring groove 4 is provided on the support 15. A lock 7' having a lower bevelled edge is provided on the belt 11 at the opposite of the rectilinear length 10. The lock 7' is housed in the groove 4.

Locking means of the container 22 on the base 20 such as bayonet locking means (not shown) are provided. The base 20 also comprises a run limiting stopper 8, able to co-operate with the rectilinear belt length 10 to limit the run of the button 3.

The container 22 has all around its lower internal circular opening 30 a surrounding flange 14 which contacts a sealing ring 12 of deformable material, provided on the support 15. The ring 12 is pressed by the flange 14 as long as the assembly 2 is correctly installed in the container 22, thus providing an efficient sealing. The flange 14 forms an annular support area provided in order to receive the sealing ring 12 of the support assembly 2.

Figure 3:
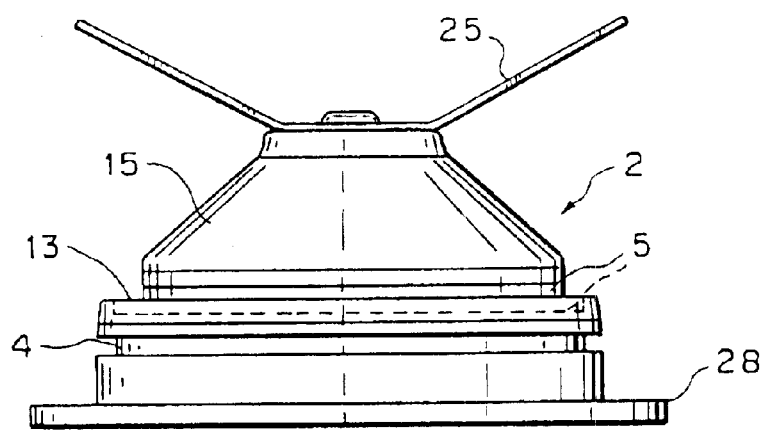
FIG. 3 is a side view of the food processing tool support assembly shown at FIG. 2.

FIG. 3 shows a side view of the support assembly 2 outside of the container 22. The support 15 is a round part which is hollow, frustoconical in its upper section, forming an opened cavity in its lower section where the engaging element (not shown in this figure) is to be located. The support 15 also presents a base flange 28. An upwardly opened ring groove 5 is provided around the support 15. The groove 5 is surrounded by a wall 13 having an upper outer bevelled edge. The groove 5 intends to house the sealing ring 12. The ring groove 4 intended to house the lock (not shown in this figure) is provided between the groove 5 and the base flange 28.

Figure 4:
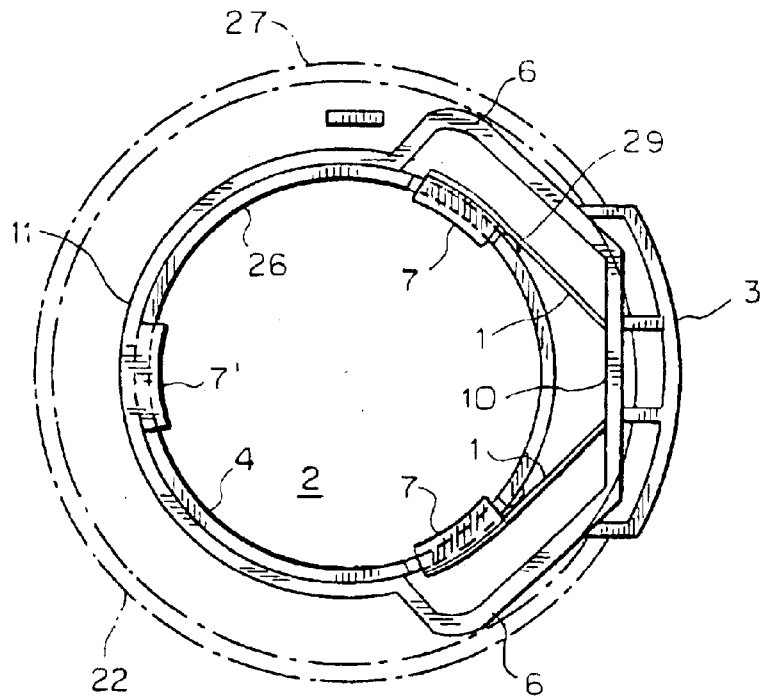
FIG. 4 is an upper view of the internal lower section of the container shown at FIGS. 1 and 2, showing a first position of the removable food processing tool support system in which the food processing tool support assembly is installed in the container.

FIG. 4 shows an upper view of the internal lower section of the container 22 showing the mentioned assembly 2 installed in the container 22, represented by a dotted line. The blades, the sealing ring, the groove and the surrounding wall are omitted to give a clearer view. The belt 11 is installed around the inner skirt 26. The belt 11 integrates two curved blade spring portions 6, extending on each side of the rectilinear length 10 attached to the button 3. The spring portions 6 lean on the internal wall of the outer skirt 27 of the container 22. Preferably, the spring portions 6 are symmetric and lean on the internal face of wall 27 at a distance around half of the inner diameter of the outer skirt.

Near the spring portions 6, projecting from the rectilinear length 10, there are two arms of a pincers 1 of a laminar format. A lock 7 is provided at the free end of each arm. As the lock 7', each lock 7 has a lower inner bevelled edge (not visible on the figures). The spring portions 6 of the belt 11 are interconnected one to the other, as explained above, by a rectilinear belt length 10 which is integrated to them, fastened to the button 3 and to the arms of the pincers 1. Preferably, each pincer's arm rest on a rib 29 provided on the inner skirt, and acting as rotating point for the arm. The groove 4 houses the locks 7 and 7', when the assembly 2 is installed in the container 22.

Figure 5:
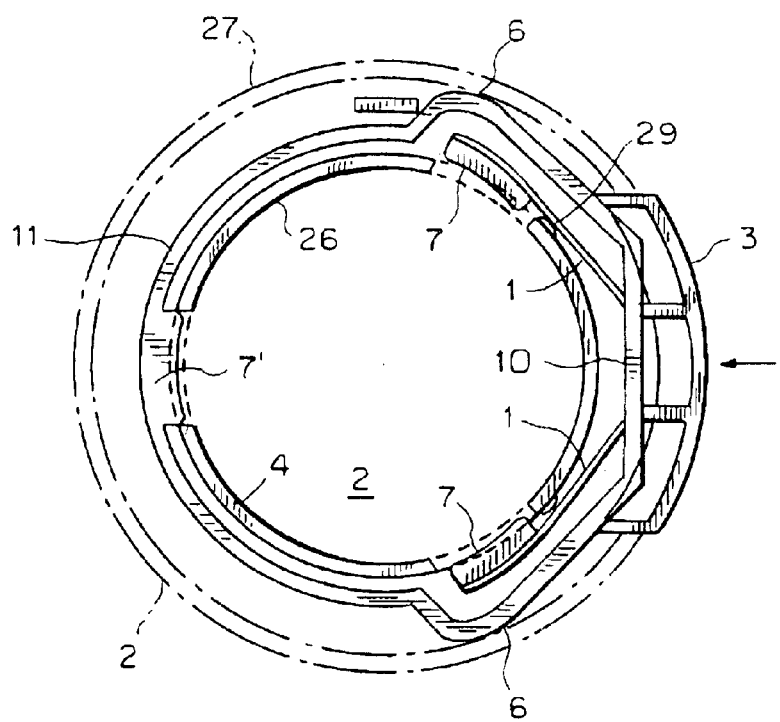
FIG. 5 is an other upper view of the internal lower section of the container shown at FIGS. 1 and 2, showing a second position of the removable food processing tool support system in which the food processing tool support assembly is about to be removed.
Figure 6:
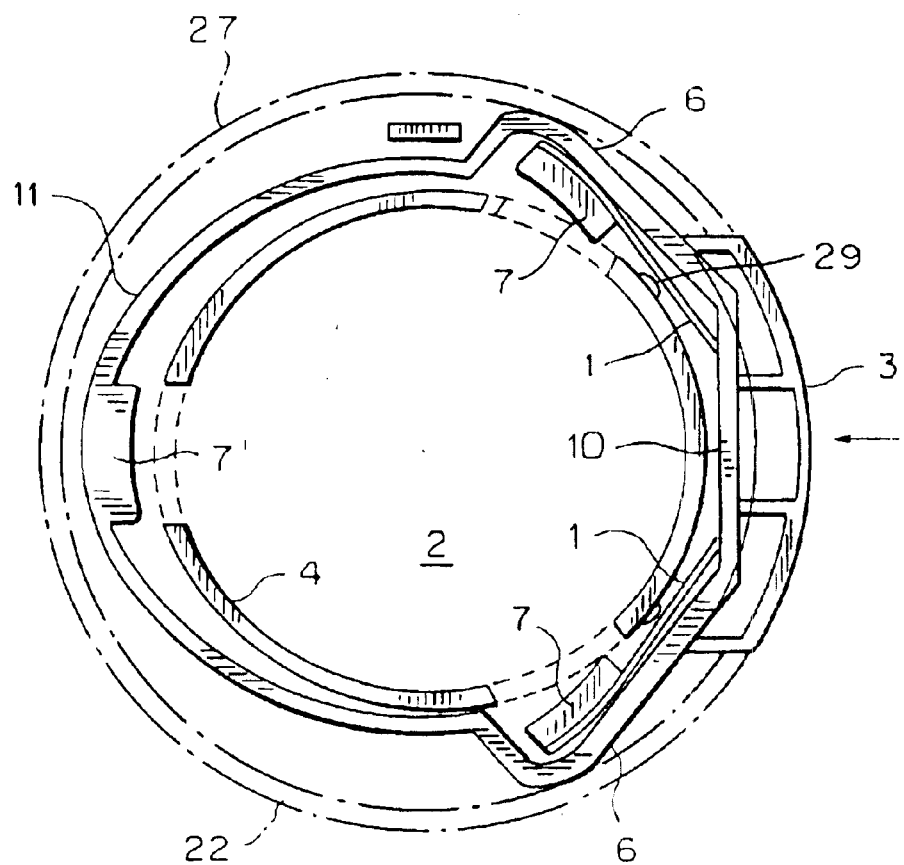
FIG. 6 is an other upper view of the internal lower section of the container shown at FIGS. 1 and 2, showing a third position of the removable food processing tool support system in which it is possible to remove the food processing tool support assembly from the container.

The operating will now be described in reference to FIGS. 1 to 6. In FIGS. 4 to 6 the blades, the sealing ring, the groove and the surrounding wall are omitted to offer clearer views.

FIG. 4 displays an upper view of the internal lower section of the container 22 showing the mentioned assembly 2 installed in the container 22, represented by a dotted line. Note how the locks 7 and 7' fit into the mentioned groove 4, firmly holding the assembly 2 in place.

FIG. 5 shows what happens when the user presses the button 3 in order to remove the support assembly 2 from the container 22. The button 3 pushes the rectilinear belt length 10 that in turn pushes the spring portions 6. The spring portions 6 lean on the internal wall of the container 22 and, since said portions are integrated with the belt 11, said portions will make the belt 11 open. The opening of the belt 11 causes the displacement of the lock 7' that exits the groove 4 of the assembly 2. At the same time, the middle section of each pincers' arms 1 is also pressed against the assembly 2 on the rib 29, making said arms open, and also displacing both locks 7 towards the outside of the groove 4.

FIG. 6 finishes showing the situation of maximum pressure on the button 3, when the pincers 1 and the belt 11 are already completely opened and the locks 7 and 7' are already completely outside the groove 4, thus freeing the assembly 2 and allowing its easy removal from below the container 22.

FIG. 2 helps to understand the function of the run limiting stopper 8 provided on the base 20 when the container 22 with the assembly 2 installed has been locked on the base 20. If the user tries to push the button 3, the rectilinear belt length 10 will contact the stopper 8. The deformation of spring portions 6 and of pincer's arms will be stopped, limiting the displacement of the locks 7 and 7', thus avoiding the freeing or removal of said assembly 2. The container 22 must be removed from the base 20 of the apparatus to allow the removal of the support assembly 2.

FIG. 2 also helps to understand the insertion of the support assembly 2 into the container 22. The support assembly 2 is axially introduced from below upwards through the opening 30 of the bottom of the container 22 and pushed into place. Thanks to the frustumconical shape of the support 15, the support assembly 2 enters the container 22, the locks 7 and 7' being pushed away by the bevelled edge of the wall 13. The support assembly 2 is stopped when the surrounding flange 14 of the container 22 touches the sealing ring 12 and, simultaneously, the locks 7 biased by the arms of the pincers 1 and the lock 7' biased by the spring portions 6 enter into the groove 4, strongly fastening the assembly 2 to the container 22.

As a variation, the groove 4 can be replaced by any type of conformation, including openings, if the opening provided in the bottom of the container 22 is not circular. As another variation, the locks 7 and 7' can enter in two or even three different grooves.

Figure 7:
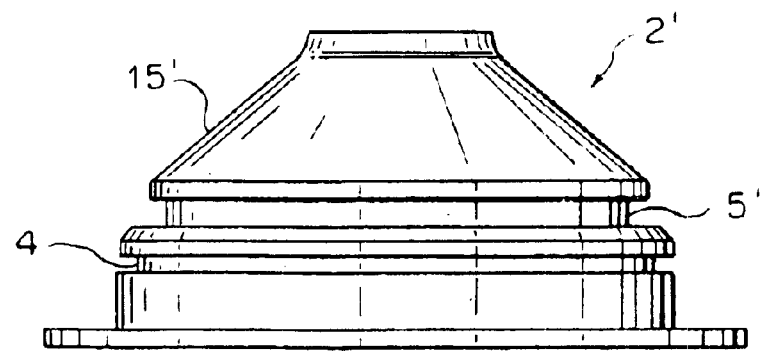
FIG. 7 is a side view of a support assembly according to a variation of the first embodiment of the invention.
Figure 8:
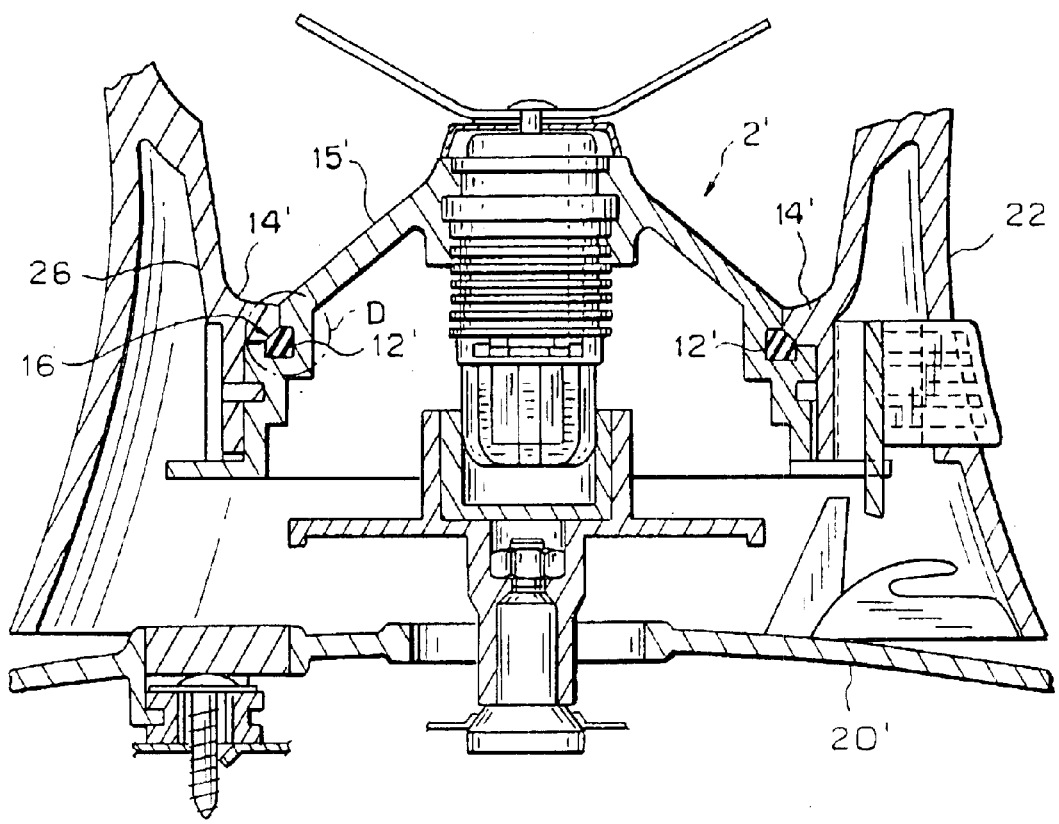
FIG. 8 is a side sectional view of the lower section of the container shown at FIG. 7, showing the removable food processing tool support system according to said variation of the first embodiment of the invention.
Figure 9:
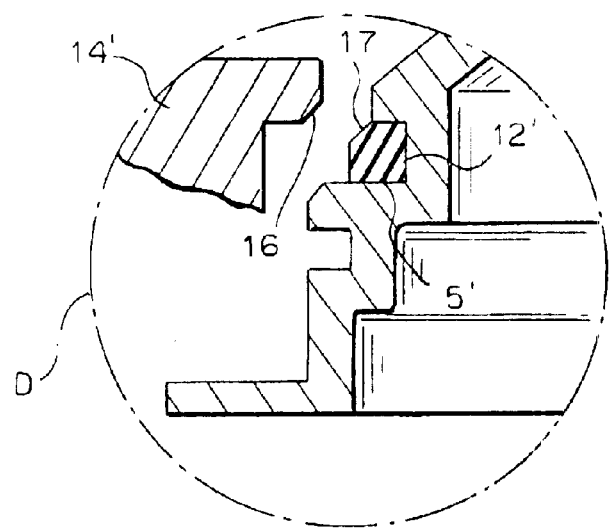
FIG. 9 is a detailed enlarged view of FIG. 8 allowing a better observation of the modification brought by said variation.

FIGS. 7 to 9 show a second example of the first embodiment of the invention.

FIG. 7 is a side view of the support assembly 2' separated from the container, not shown. The blades were omitted only due to greater graphic simplicity. The support assembly 2' is nearly totally identical to the support assembly 2 previously described, the support 15' being formed by the same round hollow part, also having the mentioned groove 4, parallel to a groove 5', both surrounding the middle section of the lower part of the support 15'. The groove 5', intended to house the sealing ring 12' (not shown at this figure) is a ring groove having a lower surrounding bevelled edge and an upper surrounding edge, and does not have the previously mentioned surrounding wall 13, this being the only difference between the support assembly 2 of the first example and the support assembly 2' of the second example.

FIG. 8 shows a side sectional view of the lower part of the container 22' having installed the support assembly 2'. It is also possible to see a motor base 20' that does not differ from the motor base 20 of the preceding example. The container 22' presents all around its interior a surrounding flange 14' having an lower inner bevelled edge 16. The edge 16 contacts an outer upper bevelled edge 17 of a sealing ring 12' manufactured of a deformable material, pressing it all the time that the support assembly 2' is installed in the container 22', thus providing an alternative way of sealing, this variation being equally efficient. The inner edge of the flange 14' is fitted around an outer flange of the support 15', and the sealing 12' is not visible inside the container 22' having installed the support assembly 2'. These differences are the only differences between the container 22 and the sealing ring 12of the first example and the container 22' and the sealing ring 12' of the second example.

FIG. 9 shows an enlarged cut-off of the bevelled edge 17 of the sealing ring 12', noting that said edge is localised adjoining the external side and upper sections of the ring 12'. This view also gives a better picture of the contact area between the edge 17 and the bevelled edge 16 of the surrounding flange 14', as well as the groove 5' in which the sealing ring 12' is housed.

FIGS. 10 to 14 show a second embodiment of the invention.

Figure 10:
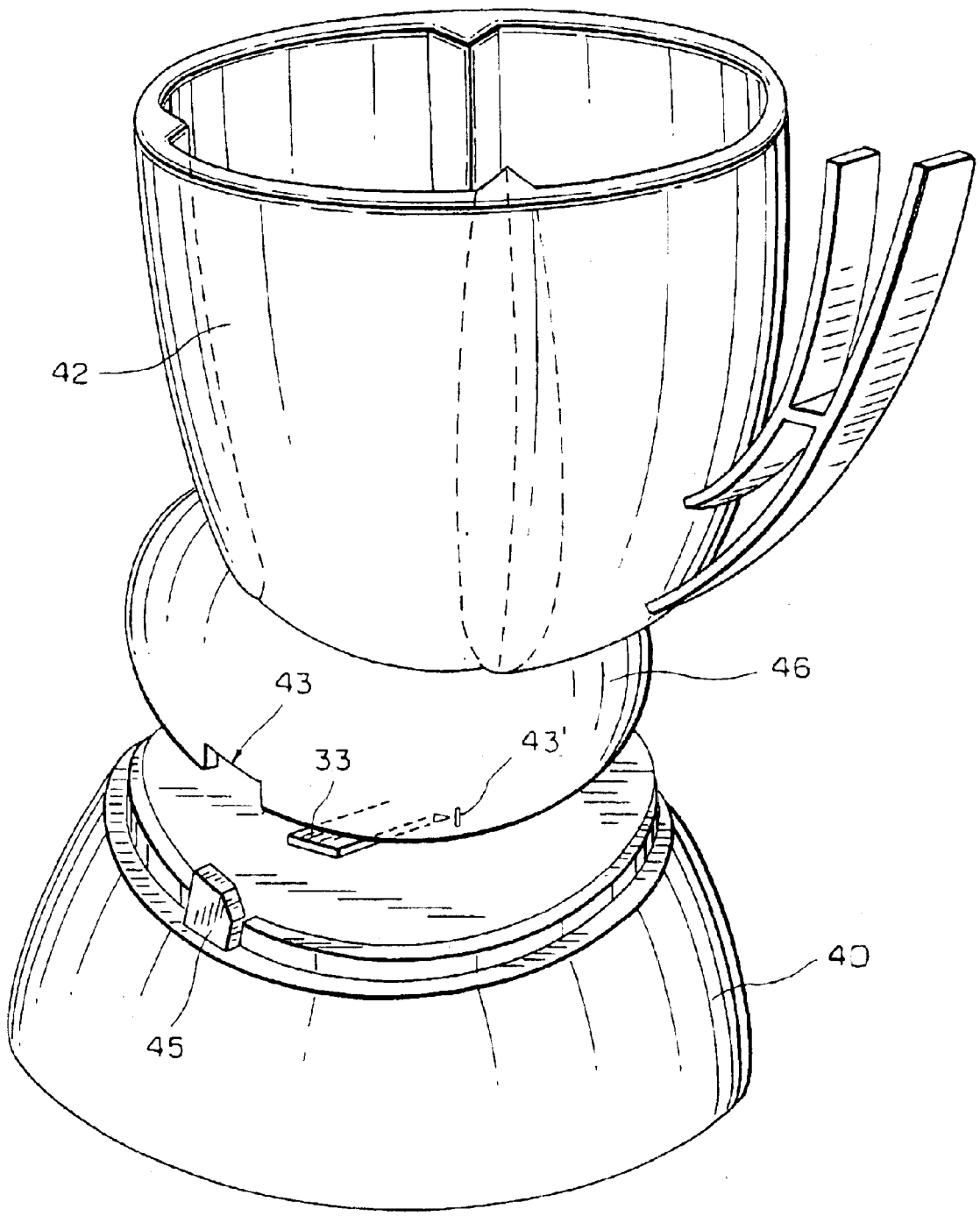
FIG. 10 is a partial view in perspective of an appliance comprising a removable food processing tool support system in accordance with a second embodiment of the invention.

FIG. 10 is a view of the upper portion of a blender motor base 40, that has a safety switch 45 installed. A lever 33 is provided under a removable container 42. A recess 43 is provided on a base part 46 of the container 42. The lever 33 is moveable between a first position in which the lever 33 is in the recess 43 and a second position 43' in which the lever 33 has been turned out of the recess 43.

Figure 11:
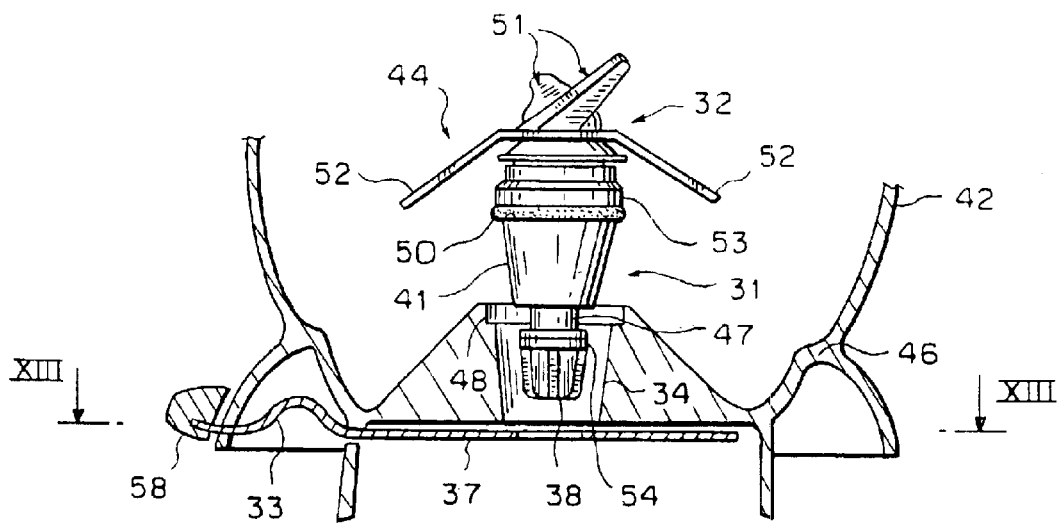
FIG. 11 is a side sectional view of the base part the container shown at FIG. 10, the food processing tool support assembly being out of the container.
Figure 12:
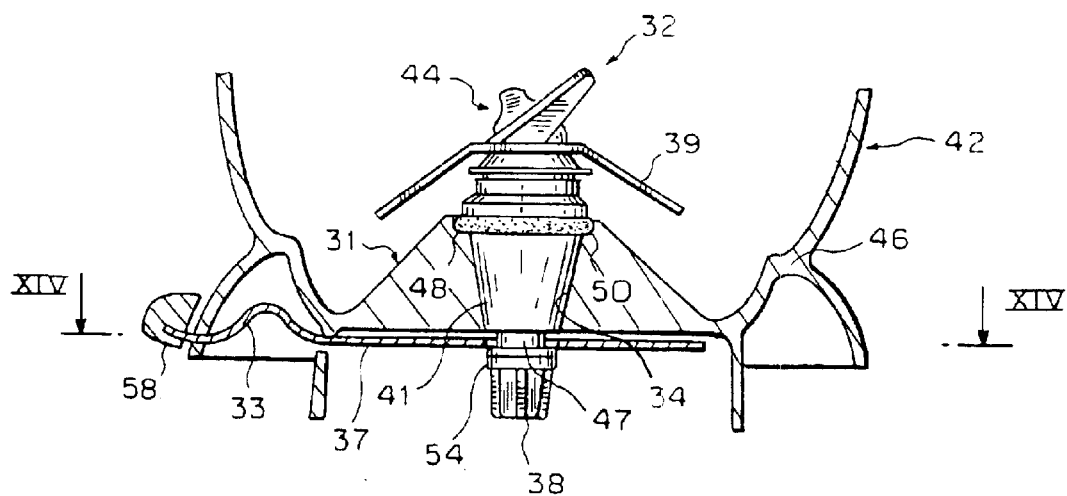
FIG. 12 is a side sectional view of the base part the container shown at FIG. 10, the food processing tool support assembly being installed in the container.

FIGS. 11 and 12 are side sectional views of the base part 46 of the container 42 showing a locking plate 37 integrated to the lever 33. Note that there is a knob 58 installed at the end of the lever 33, in order to make its handling easier. The locking plate is mounted under a flat bottom of the base part 46 of the container 42. The bottom of the base part 46 has in its centre a through conical hole 34 widening at its upper portion, which forms a housing 48.

A food processing tool support assembly 32 comprises a food processing tool 44 mounted on a support 31. The food processing tool 44 comprises two upwardly outward inclined blades 51 and two downward outward inclined blades 52 alternatively fitted at one extremity of an axle turning into an internal bearing of the support 31. An engaging element 38 for coupling with a motor axle provided in the motor base is fitted at the other extremity of the support axle. The support 31 comprises a conic body 41 having an upwardly increasing diameter. A sealing ring 50 is fitted at the upper extremity of the conic body 41 against an upper flange 53. The sealing ring 50 can be made of rubber. The support 31 also comprises a recess as a cylindrical body 47 provided at the lower extremity of the conic body. The diameter of the cylindrical body 47 is smaller than the lower diameter of the conic body 41. A lower flange 54 having a larger diameter than the diameter of the cylindrical body 47 is provided below said cylindrical body.

FIG. 11 shows the support assembly 32 out of place, i.e. with the support 31 and the blades 51, 52 not installed on the base part 46 of the container 42. This figure shows that when the support assembly 32 is removed from the container 42 said support assembly comes off upwards from the above base part 46, though the container 42.

FIG. 12 shows the support assembly 32 installed and correctly placed on the base part 46. The conic body 41 perfectly fits into the though conical hole 34 of the base part 46, with the sealing ring 50 within the housing 48. The conical shape of these parts and the sealing ring 50 produce a practically hermetic seating, avoiding water leakage. The housing 48 forms an annular support area provided to receive the sealing ring 50 of the support assembly 32. The cylindrical body 47 goes through an opening provided in the locking plate 37, which fastens and holds the support assembly 32 in place.

Figure 13:
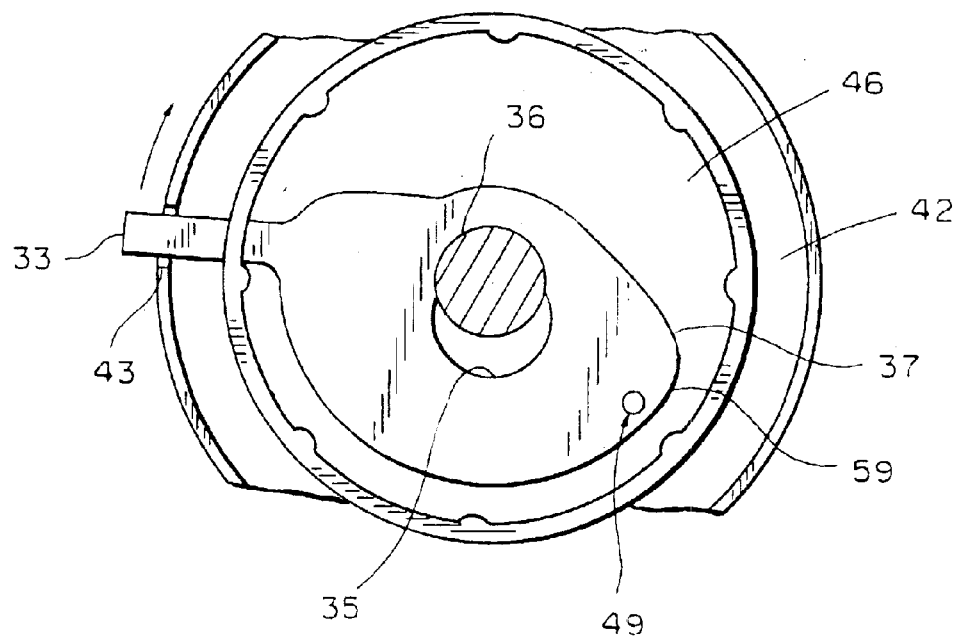
FIGS. 13 and 14 are downward axial views illustrating the details of the lower portion of the base part of the container shown at FIG. 10.

FIG. 13 is a view illustrating the details of the lower portion of the base part 46 of the container 42, showing the locking plate 37 integrated with the lever 33, also containing an opening constituted by a larger hole 35 and a smaller hole 36, and a hole 59 provided close to the edge of said locking plate. By the hole 59 passes an axle that can be a rivet, for example, fixed to the base part 46, constituting a pivotal point 49. The lever 33 is placed in the recess 43 and the system is locked in the normal working position, with the smaller hole 36 represented shaded. The mentioned recess made as a cylindrical body has a diameter equal to that of the smaller hole 36. Thus all the support assembly 32 which includes the blades is correctly placed. In order to remove the blades with the support, the lever 33 must be removed from the recess 43 and moved as indicated by the arrow to rotate the locking plate 37 around the pivotal point 49.

Figure 14:
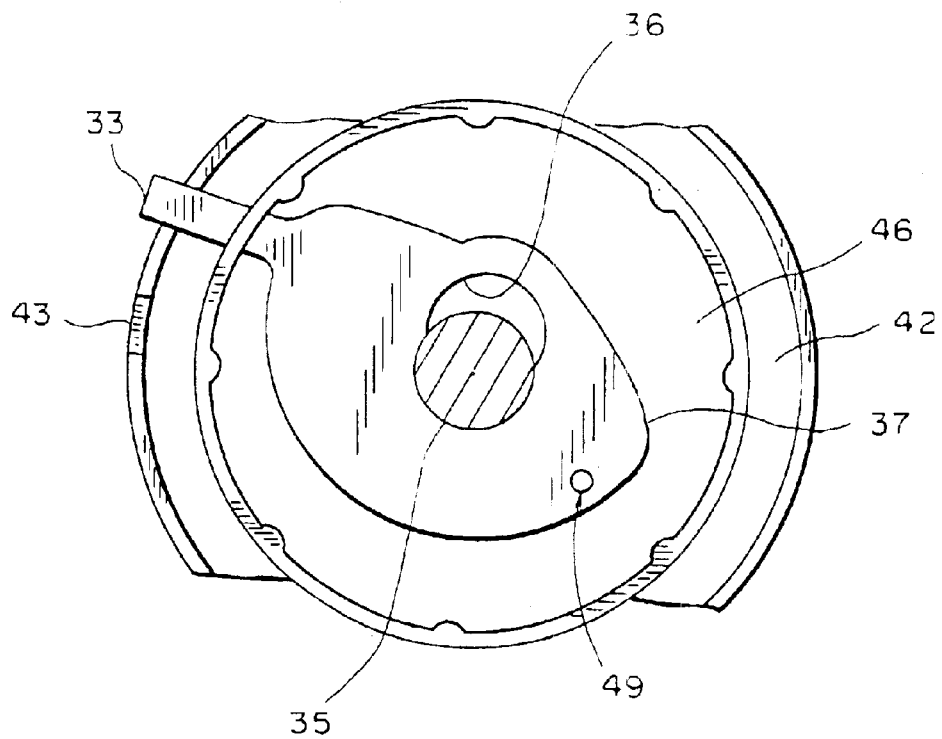

FIG. 14 is a view showing the details of the lower portion of the base part 46, with the lever 33 already moved in the direction indicated by the arrow, positioned out of the recess 43, releasing the switch. This avoids the activation of the motor accidentally without the container 42 being attached, thus allowing the removal of the support assembly 32 including the blades. The locking plate 37 turned around the pivotal point 49 and the smaller hole 36 was displaced, giving way to the larger hole 35, represented shaded. The larger hole 35 has a larger diameter than that of the smaller hole 36 and is able to release the mentioned cylindrical body which was coupled to the smaller hole 36. The diameter of the larger hole 35 is slightly larger than the maximum diameter of the engaging element 38 and flange 54 of the lower part of the support assembly, which can pass with relatively ease through the larger hole 35 when the support assembly is removed from above the base part 46 through the inside of the container.

When the support assembly is correctly installed on the base part 46 of the container 42, the lever 33 is in the recess 43. Then when the base part 46 of container 42 is correctly placed and fitted on the motor base 40, the lever 33 presses the switch 45 that remains activated, allowing the functioning of the blender motor. If the container 42 is not placed on the motor base 40, the blender does not work, since the switch 45 is deactivated. This is a safety factor which avoids the operation of the blender if the support assembly is not correctly placed, or if the lever 33 is broken, or if the container 42 is not correctly placed.

To remove the support assembly 32 from the container 42, said container must be removed from the motor base 40. To install the support assembly 32 in the container 42, said container must also be removed from the motor base 40.

On FIGS. 15 to 20 can be seen a third embodiment of the invention.

Figure 15:
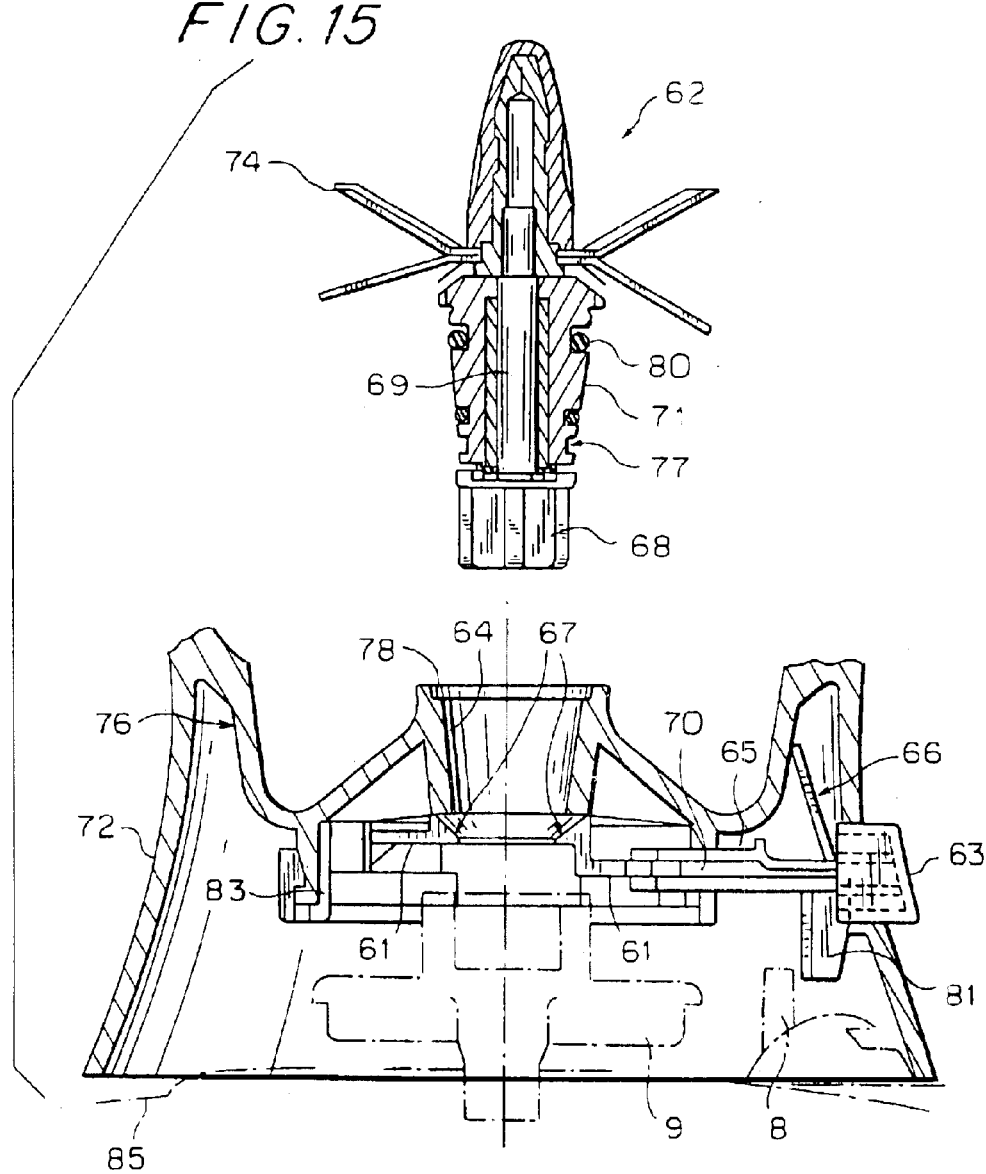
FIGS. 15 and 16 are respectively side sectional view and downward axial view of the base part of the appliance's container comprising a removable food processing tool support system in accordance with a third embodiment of the invention, the food processing tool support being out of the container.

FIG. 15 shows the food processing tool support assembly 62 outside the blender's or similar home appliance's jug. This tool support, fairly similar to the one described in relation with the second embodiment, comprises a conic body 71 acting as a bearing for an internal axle 69 having a set of knives 74 in its upper extremity and an engaging element 68 in its lower extremity. The conic body 71 has a rubber O-ring 80 around its upper periphery and presents a cylindrical body, or groove, 77 in its lower periphery.

The dotted line apparatus body 85 comprises a run limiting stopper 8 and a coupling element 9 which is attached to the motor axle of the apparatus and it is the one that couples to the engaging element 68 of the axle 69 of the mentioned tool support assembly 62 in order to make the knives 74 rotate.

The base of the container 72 presents an upward conical inner skirt 76 with a central downward through conical hole 64 adapted to receive the conical body 71 of the tool support assembly 62. The upper periphery of the through conical hole 64 presents a housing or seat 78 to receive the sealing ring 80.

Figure 16:
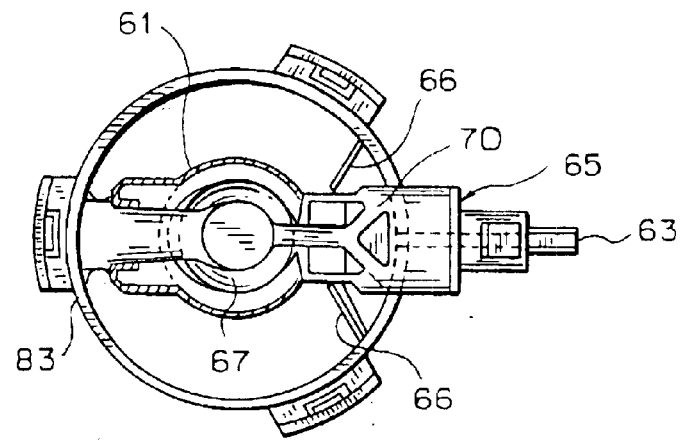

More particularly in this embodiment, and as can be better seen on FIGS. 15 and 16, the locking means comprise a tweezers composed of a pair of arms 61 rotating in a plane transversal to the axle 69, the outer extremity of each arm being attached in a rotary manner to the periphery of an holding ring 83, the middle part being shaped as curved slanted locks 67 around the vertical middle axle, the inner extremity showing a slanted front forming, with the slanted front of the other arm, a V-shape. The holding ring 83 comprises a pair of spring knives 66, each of them pressing inwardly on the inner extremity of an arm.

In front of the tweezers a sliding activating rod 65 with a lower screen 81 is arranged, this rod being extended outside the base of the container 72 by a control button 63. The sliding rod 65 presents a triangular edge 70 bearing on the slanted front of each arm 61 of lock.

FIG. 16 shows the tweezers in a closed position due to the pressing of the spring knives 66, the activating rod and its triangular edge being retracted outside. The jug 72 without the tool support assembly 74 cannot be installed on the apparatus body 85 because, with the tweezers 61 in the closed position, the coupling element 9 cannot pass through it. Even if the user keeps the button 63 pressed, to maintain the tweezers open, the screen 81 will then hit the limiting stopper 8.

With the tweezers closed, the insertion of the tool support assembly 62 in the jug 72 from up downward is possible due to the upwardly slanted portion of the curved lock 67 which are pushed apart by the engaging element 68. When the tool support assembly 62 is continued to be pushed down, the conic body 71 of the bearing comes to rest in the through conical hole 64, and the internal edge of the locks of the tweezers are able to enter the groove 77.

Figure 17:
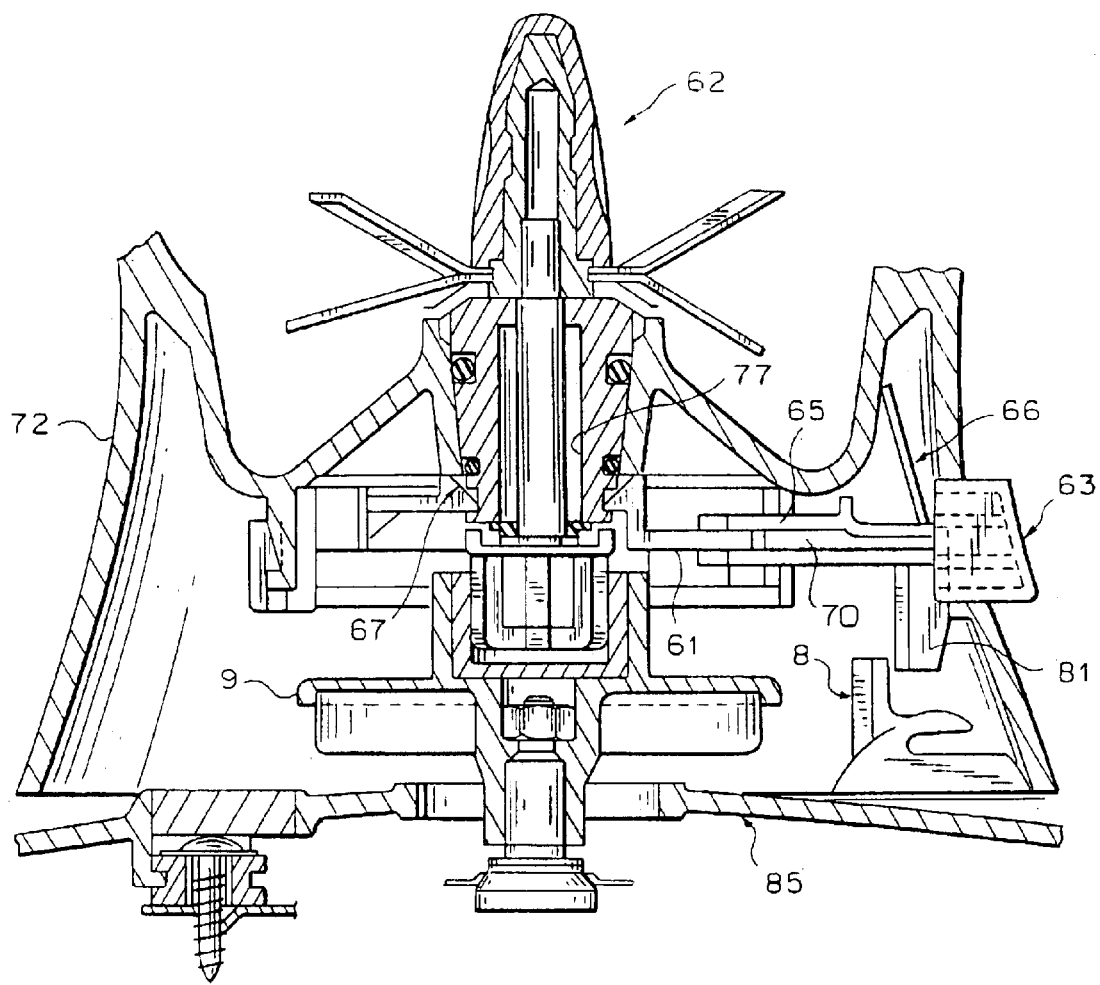
FIGS. 17 and 18 are respectively side sectional view and downward axial view of the base part of the container as per the third embodiment of the invention, the food processing tool support being engaged and locked in the container.
Figure 18:
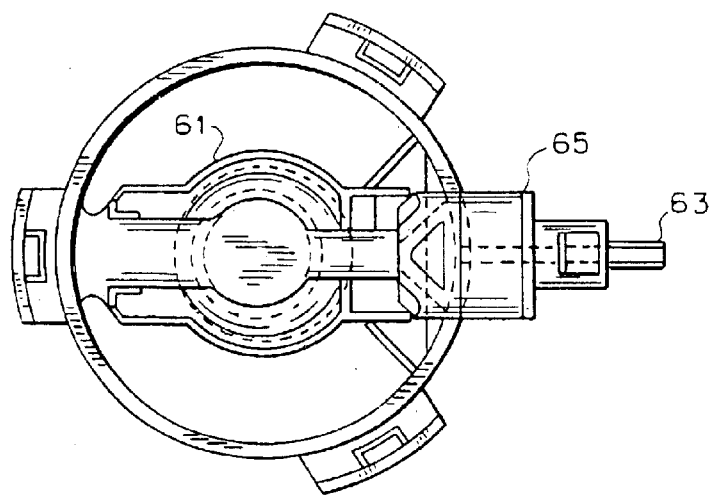

FIGS. 17 and 18 show the apparatus when the tool support assembly 62 is installed in the jug 72 which is itself placed properly on the apparatus' body. The slanted locks 67 are inserted into the groove 77 of the conic body fastening the tool support in place. The button 63 is in the stand by position, the triangle edge 70 being pushed by the inner extremity of arm lock 61 being themselves 5 pushed by the spring knives 66.

Since the jug or container 72 is placed on the apparatus body 85, if somebody tries to press the button 63, its screen 81 will lie against the limiting stopper 8 preventing its movement, and consequently the removal of the tool support assembly 62.

Figure 19:
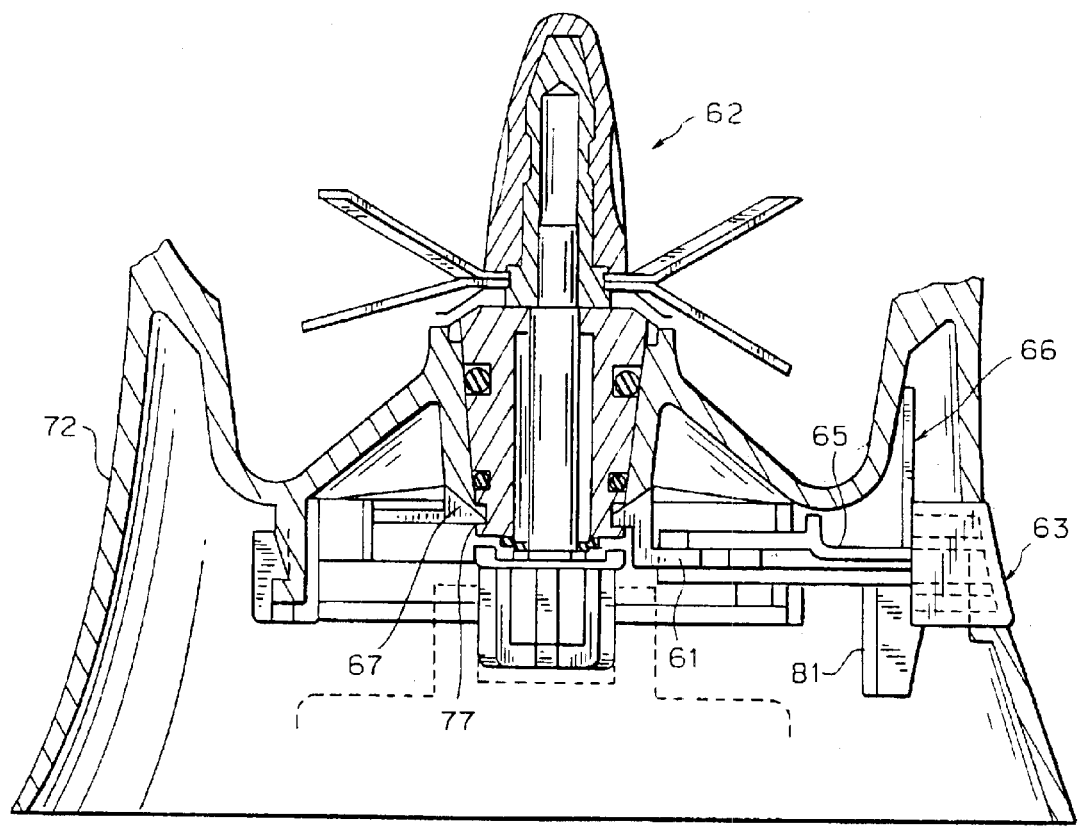
FIGS. 19 and 20 are respectively side sectional view and downward axial view of the base part of the container as per the third embodiment of the invention, the food processing tool support being unlocked, ready to be removed out of the container.
Figure 20:
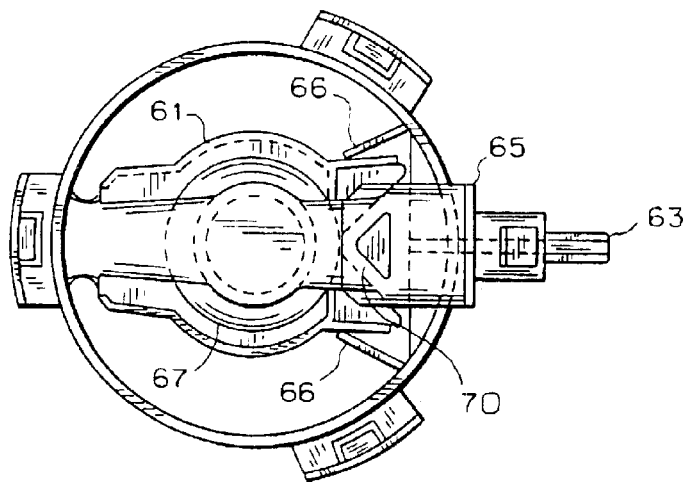

FIGS. 19 and 20 show cut off view and upper axial view of the tool support assembly 62 at the time this assembly is about to be removed from the container which has been removed from the base of the apparatus. The jug 72 must be taken away from the apparatus body, and the lid must be taken off in order to access the food processing tool. The control button 63 with its screen is then free to be pushed. The triangular edge 70 of the activating rod 65 pushes the two arms 61 apart to open the tweezers. The spring knives 66, lying against the sides of the tweezers, exert a force (spring effect) to try to close them. When the tweezers are open, the edges of the slanted parts of locks comes out of the grooves 77 of the conic body 71 which is free for removal.

Figure 21:
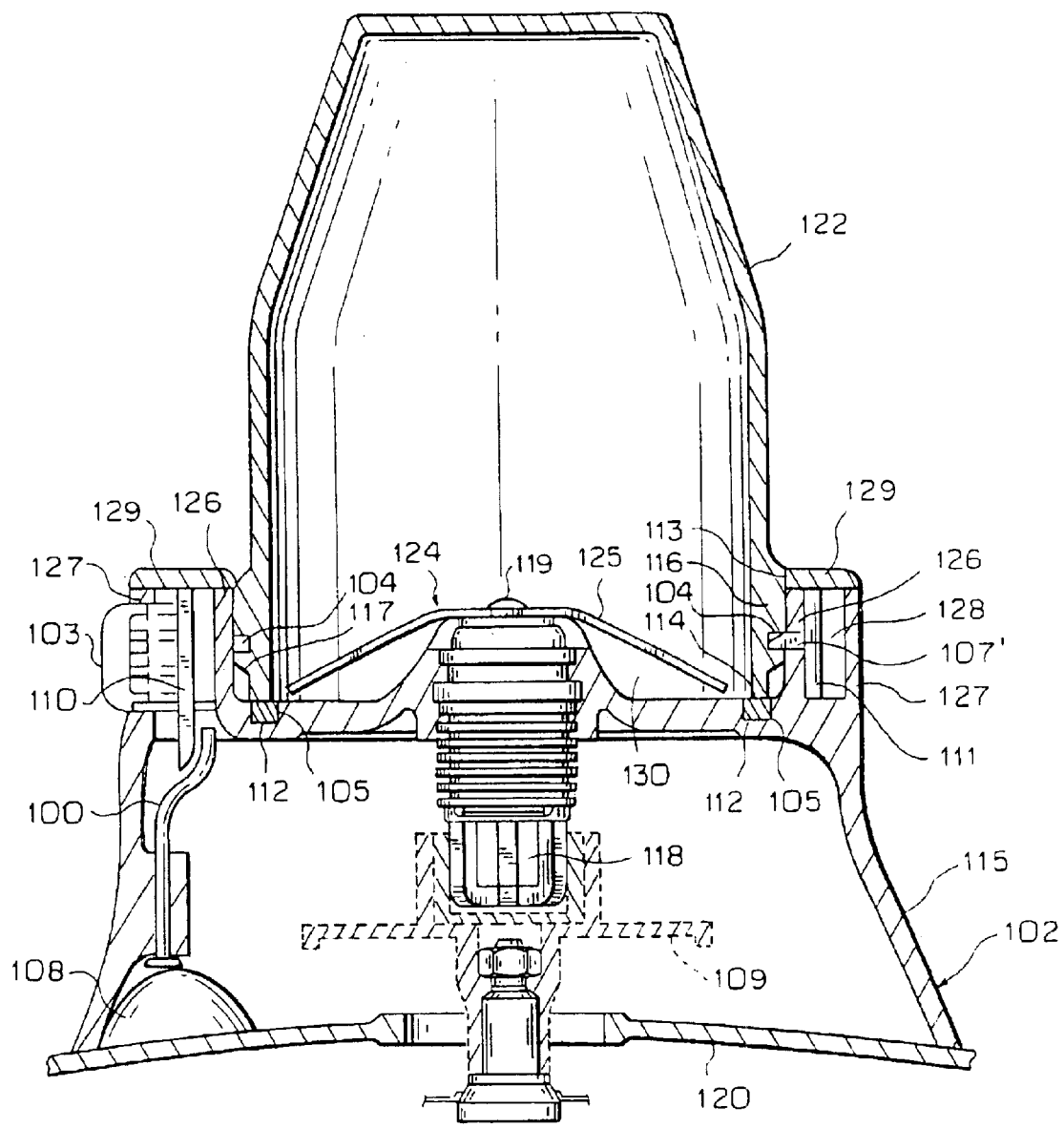
FIG. 21 is a side sectional view of the container and of the food processing tool support assembly mounted on the motor base of an appliance comprising an example of a removable food processing tool support system in accordance with a fourth embodiment of the invention.

FIG. 21 shows a grinder according to a fourth embodiment of the invention. The apparatus comprises a base 120 including an electric motor (not shown), a support assembly 102 and a container 122. The motor drives a dividing element 109 able to couple with an engaging element 118 of the support assembly 102 when said assembly is mounted on said base.

The support assembly 102 comprises a support 115 able to be removably secured on the base 120, by securing means such as bayonet locking means (not shown). An axle 119 is fitted in an internal bearing (not shown) of the central part of the support 115. The engaging element 118 is mounted on the lower extremity of said axle and a food processing tool 124 is mounted on the upper extremity of said axle. The food processing tool 124 comprises two downwardly outward inclined blades 125. A sealing ring 112 is provided in an upwardly opened ring groove 105 surrounding the food processing tool 124. An upwardly extending wall 126 surrounds the groove 105. An outer wall 127 extending upwardly from the support 115 surrounds the wall 126, providing an annular housing 128. A cover 129 closes the upper opening of the housing 128.

A belt 111 is installed in the housing 128. The belt 111 is similar to the belt 11 of the first embodiment and comprises a length 110 co-operating with a control button 103 mounted in a lateral opening of the outer wall 127, as well as spring portions and pincers' arms having locks at their free end. A lock 107' is provided on the belt 111 at the opposite of the control button. The locks are able to enter an annular groove 104 surrounding a side wall 113 of the container 122.

The container 122 has an opening 130 whose edge 114 is able to seat on the sealing ring 112, which forms a support area. The part of side wall 113 surrounding said opening is basically cylindrical. The groove 104 is provided near said opening on an part 116 of the side wall 113 having a larger thickness than the rest of said side wall. An outer conical part 117 is provided between the groove 104 and said opening. The extremity of the container 122 opposite to the opening 130 is closed and the diameter of the container 122 decreases nearby said closed extremity.

A run limiting stopper 108 is provided on the base 120. When the support 115 is mounted on the base 120, the run limiting stopper 108 pushes up a pin 100 able to stop the displacement of the length 110 of the belt 111 when this latter is pushed by the control button 103. The removal of the locks from the groove 104 is therefore prevented. Preferably, the pin 100 is mounted against a return spring (not shown) on the inner face of the support 115.

To operate the grinder, the product to be processed is introduced in the container 122. The support assembly 115 is then introduced on the open top of the container 122. The locks are pushed by the conical part 117 away and then enter into the groove 104. Thus, the edge 114 is maintained against the sealing ring 112. The assembly is turned over to be installed on the base 120. Grinding can be started.

To remove the container, the assembly has to be removed first from the base 120 so that the pin 100 frees the length 110 of the belt 111.

A container having a first opening to be mounted on the support assembly 102 and an opposite opening can also be used with said support assembly. Apparatus such as blender of food processor can thus be obtained.

As a variation, the groove 104 can be replaced by any type of conformation, including openings, if the opening 130 formed by the edge 114 of the container 122 is not circular. As another variation, the locks 7 and 7' can enter in two or even three different grooves.

FIG. 22 shows a blender according to a variation of the first embodiment of the invention comprising the same locking system than the previous example.

The apparatus comprises a base 120 including an electric motor (not shown), a support assembly 102' and a container 122' able to be removably secured on the base 120. The food processing tool support assembly 102' having a tool 124' is installed on the container 122'. The tool 124' comprises two upwardly outward inclined blades 125' fitted at the upper extremity of the axle 119 turning into an internal bearing of the support 115'.

The container 122' has an inner skirt 131 forming an opening 130' in the bottom of said container and presenting a lower edge 114' able to fit against a sealing ring 112' provided on the support 115' of the support assembly 102'. An outer groove 104' is provided around the skirt 131. An outer conical part 117' is provided between said groove and said opening. The control button 103' and the locking device including the lock 107' are mounted on the support 115'. An outer skirt 132 of the container hides an actuating arm 133 of the control button extending under the support 115' when the container 122' having installed the support assembly 102' is engaged on the base 120. A rib 134 extending from the support 115' makes the actuation of the arm 133 easier.

As a variation of the third embodiment, the locking system can be provided on the support assembly.

As a further variation of the third embodiment, the support assembly can be provided to be mounted on the motor base.

The following advantages can be obtained with the system proposed herein, as described by the examples.

the fitting system of the support assembly to the container is very trustworthy to maintain the blades in their correct position, even when functioning with food that is difficult to be crushed, such as seeds, ice cubes, etc.

the container without the support assembly can be better and easier washed, even in dishwashers;

low cost.

Having described some preferred examples, it must be understood that the scope of the present invention covers other possible variations, only being limited by the content of the claims attached, where possible equivalents are included.

The food processing tool can consist of other kinds of tools, such as an ice crusher or a whisk, for instance.

What is claimed is:

1. Food processing or blending appliance able to be mounted on a separate base that contains an electric motor to constitute a food processor or blender, said appliance comprising:

a first appliance component constituting a container adapted to be mounted on the base, said container having a bottom provided with an opening;

a food processing tool support assembly associated with said container, said assembly having;

a second appliance component constituting a tool support removably secured in said opening provided in said bottom of said container, said support having an axis;

a rotary axle mounted through said support, said axle having two extremities;

an engaging element able to be driven by the electric motor when said container is mounted on the base, said engaging element being borne at one of said extremities of said axle; and a food processing tool mounted at the other of said extremities of said axle, said food processing tool being rotatable about said axis;

wherein one of said appliance components comprises locking means and a control button and the other of said appliance components has at least one conformation that is disposed in correspondence with said locking means when said container is in a given position relative to said tool support along said axis and has been brought to bear against a support area provided around said opening in said bottom of said container, said locking means being movable in a plane transverse to said axis to engage said at least one conformation when said container is in the given position relative to said tool support, said locking means being actionable by said control button.

2. Food processing or blending appliance according to claim 1, wherein said control button is moveable between a locked position in which said locking means are able to hold said tool support against the support area, and a released position in which said locking means are able to release said tool support from the support area.

3. Electrical blender or food processor comprising; the food processing or blending appliance according to claim 2; and retaining means for preventing any displacement of said control button from the locked position when said container is mounted on the base.

4. Food processing or blending appliance according to claim 2, wherein said control button is mounted for movement against elastic return means for biasing said locking means and said control button into the locked position.

5. Food processing or blending appliance according to claim 1, wherein the support area is ring-shaped, a corresponding part of said tool support is also ring-shaped, and the at least one conformation is an annular groove.

6. Food processing or blending appliance according to claim 1, further comprising a sealing ring provided between the support area and said tool support.

7. Food processing or blending appliance according to claim 1, wherein said locking means comprise three locks regularly spaced around the periphery of the at least one conformation.

8. Food processing or blending appliance according to claim 7, wherein: said locking means comprise a belt and two pincer arms each having a free end, said belt having a portion adapted to cooperate with said control button and said pincer arms projecting from said portion; one of said locks is disposed at a location opposite to said portion; and the other two locks each being provided at the free end of a respective one of said arm; and said locking means are adapted to enter in the at least one conformation.

9. Food processing or blending appliance according to claim 1, wherein: said tool support assembly further comprises an engaging element having an outer diameter; said tool support comprises a cylindrical body having an outer diameter; and said locking means are provided on said container and comprise a locking plate provided with a first hole defining an aperture and a second hole, said first hole having a diameter that corresponds to the diameter of said cylindrical body, and said second hole having a diameter that is larger than the outer diameters of said cylindrical body and of said engaging element.

10. Food processing or blending appliance according to claim 9, wherein: said tool support comprises a conical body; said cylindrical body is disposed between said conical body and said engaging element; and said opening in the bottom of said container has a conical form into which said conical body is adapted to fit.

11. Food processing or blending appliance according to claim 1, wherein: said locking means comprise a tweezers and a holding ring; said tweezers are composed of a pair of arms rotatable in a plane transverse to said axle, each arm having an outer extremity, a middle part and an inner extremity; the outer extremity of each arm is attached in a rotary manner to the periphery of said holding ring; the middle part of each arm is provided with curved slanted locks; the inner extremity of each arm has a slanted front forming, with the slanted front of the other arm, a V-shape; and said holding ring comprises a pair of spring knives, each said knife pressing inwardly on the inner extremity of a respective arm.

12. Food processing or blending appliance according to claim 11, further comprising a sliding activating rod disposed in front of said tweezers, said sliding rod extending outside of said container and being connected outside of said container to said control button, and said sliding rod presenting a triangular edge bearing on the slanted front of each of said arms.

13. Food processing, blending, or grinding appliance able to be mounted on a separate base that contains an electric motor to constitute a food processor, blender, or grinder, said appliance comprising:
a food processing tool support assembly adapted to be mounted on the base, said support assembly having:
a support;
a rotary axle mounted to extend through said support, said axle having two extremities;
an engaging element adapted to be driven by the electric motor when said support assembly is mounted on the base, said engaging element being borne at one of said extremities of said axle; and
a food processing tool mounted at the other of said extremities of said axle, said food processing tool being rotatable about said axis; and
a container having an opening provided with an edge, said container further having at least one conformation and being adapted to be mounted on said support assembly, wherein:
said tool support assembly comprises locking means and a control button;
said edge of said opening of said container is maintained against a support area provided around said food processing tool by said locking means;
said locking means are engageable in an approximately radial direction with said at least one conformation; and
said locking means are actionable by said control button.

14. Food processing, blending, or grinding appliance according to claim 13, wherein said control button is moveable between a locked position in which said locking means are able to hold said container against the support area, and a released position in which said locking means are able to release said container from the support area.

15. Electrical grinder, blender or food processor, comprising: a food processing, blending, or grinding appliance according to claim 14; and retaining means for preventing any displacement of said control button from the locked position when said container is mounted on the base.

16. Food processing, blending, or grinding appliance according to claim 13, wherein said opening is circular, the support area is ring-shaped, said edge of said container is ring-shaped, and said at least one conformation, in which said locking means engage, is an annular groove.

17. Food processing, blending, or grinding appliance according to claim 13, further comprising a sealing ring provided in said tool support assembly and forming the support area.

* * * * *